US011223259B2

(12) United States Patent
Kawai et al.

(10) Patent No.: US 11,223,259 B2
(45) Date of Patent: Jan. 11, 2022

(54) METHOD FOR MANUFACTURING A STATOR

(71) Applicants: TOYOTA JIDOSHA KABUSHIKI KAISHA, Toyota (JP); DENSO CORPORATION, Kariya (JP)

(72) Inventors: Masashi Kawai, Nissin (JP); Yasushi Nishikuma, Toyota (JP); Hiroaki Takeda, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 272 days.

(21) Appl. No.: 16/192,116

(22) Filed: Nov. 15, 2018

(65) Prior Publication Data

US 2019/0157949 A1    May 23, 2019

(30) Foreign Application Priority Data

Nov. 17, 2017   (JP) .............................. JP2017-222315

(51) Int. Cl.
| | |
|---|---|
| *H01F 7/06* | (2006.01) |
| *H02K 15/00* | (2006.01) |
| *H02K 15/10* | (2006.01) |
| *H02K 15/12* | (2006.01) |
| *H02K 5/08* | (2006.01) |
| *H02K 1/04* | (2006.01) |
| *H02K 15/02* | (2006.01) |

(52) U.S. Cl.
CPC .......... *H02K 15/0043* (2013.01); *H02K 5/08* (2013.01); *H02K 15/10* (2013.01); *H02K 15/12* (2013.01); *H02K 1/04* (2013.01); *H02K 15/02* (2013.01)

(58) Field of Classification Search
CPC ...... H02K 1/04; H02K 15/0043; H02K 15/02; H02K 15/08; H02K 15/10; H02K 15/122
See application file for complete search history.

(56) References Cited

U.S. PATENT DOCUMENTS

| | | | | |
|---|---|---|---|---|
| 5,778,512 A | * | 7/1998 | Ichikawa | ........... H02K 15/0414 |
| | | | | 29/598 |
| 6,333,573 B1 | * | 12/2001 | Nakamura | ............... H02K 3/24 |
| | | | | 29/596 |
| 8,347,656 B2 | * | 1/2013 | Aoki | ..................... C03B 37/035 |
| | | | | 65/535 |

(Continued)

FOREIGN PATENT DOCUMENTS

| | | | | |
|---|---|---|---|---|
| CN | | 103973016 A | 8/2014 | |
| JP | | 61018334 A | * 1/1986 | ............... H02K 3/38 |

(Continued)

*Primary Examiner* — Paul D Kim
(74) *Attorney, Agent, or Firm* — Sughrue Mion, PLLC

(57) ABSTRACT

To effectively cover a coil end with a resin layer. A method for manufacturing a stator includes a first resin layer forming step (ii) of forming a first thermoset resin layer by impregnating the tip end side of a coil end with first thermoset resin, the coil end protruding from the core of the stator, the first thermoset resin having liquidity; a second resin layer forming step (iii) of forming a second thermoset resin layer on the first thermoset resin layer by dropping second thermoset resin from the core side of the coil end toward the tip end side; and a curing step of curing the first thermoset resin and the second thermoset resin.

5 Claims, 10 Drawing Sheets

(56) References Cited

U.S. PATENT DOCUMENTS

| | | | | |
|---|---|---|---|---|
| 9,957,413 B2* | 5/2018 | Muraki | ............... | C09D 167/00 |
| 2004/0222710 A1* | 11/2004 | Kashihara | ............... | H02K 1/16 |
| | | | | 310/43 |
| 2005/0074553 A1* | 4/2005 | Takahashi | ............ | H01F 41/127 |
| | | | | 427/240 |
| 2006/0045976 A1* | 3/2006 | Nakayama | ........... | H01F 17/045 |
| | | | | 427/372.2 |
| 2014/0209018 A1 | 7/2014 | Jin et al. | | |

FOREIGN PATENT DOCUMENTS

| | | | |
|---|---|---|---|
| JP | 01129735 A | * | 5/1989 |
| JP | 2000-209802 A | | 7/2000 |
| JP | 2012-161153 A | | 8/2012 |
| JP | 2014-039345 A | | 2/2014 |
| JP | 2017-189058 A | | 10/2017 |

* cited by examiner

METHOD FOR MANUFACTURING A STATOR

CROSS REFERENCE TO RELATED APPLICATION

The disclosure of Japanese Patent Application No. 2017-222315 filed on Nov. 17, 2017 including the specification, claims, drawings, and abstract is incorporated herein by reference in its entirety.

TECHNICAL FIELD

This disclosure relates to a method for manufacturing a stator whose coil end is covered with resin, and to a stator.

BACKGROUND

Patent Document 1 describes that the connection portion of the coils in a coil end is impregnated with resin and the resin is thereafter cured, whereby the connection portion in the coil end is buried in the resin.

CITATION LIST

Patent Literature

Patent Document 1: JP 2000-209802A

SUMMARY

In impregnating a coil end with resin, the resin may fail to permeate well into the upper surface side (a core side) of the coil. This may result in insufficient insulation. That is, in the case where coils are disposed at relatively density, a space may be left unfilled with resin between coils, even well below the surface of the liquid resin.

A method for manufacturing a stator according to this disclosure includes: a first resin layer forming step of forming a first thermoset resin layer by impregnating the tip end side of a coil end with first thermoset resin, the coil end protruding from the core of the stator, the first thermoset resin having liquidity; a second resin layer forming step of forming a second thermoset resin layer on the first thermoset resin layer by dropping second thermoset resin from the core side of the coil end toward the tip end side; and a curing step of curing the first thermoset resin and the second thermoset resin.

The second thermoset resin may have viscosity lower than that of the first thermoset resin.

The curing step may include a first curing step and a second curing step, the first curing step may be executed after the first resin layer forming step to cure the first thermoset resin, and the second curing step may be executed after the second resin layer forming step to cure the second thermoset resin.

In the first resin layer forming step, the first thermoset resin may be liquid and pooled inside a die, and the tip end side of the coil end may be plunged into the first thermoset resin, which is liquid, and kept plunged until the level of the liquid surface of the first thermoset resin inside the die rises along the circumferential wall of the die and lowers in the middle portion of the first thermoset resin.

The coil end including a plurality of coil conducting wires aligned in the circumferential direction of the stator may protrude from the core of the stator.

A stator according to this disclosure includes a first resin layer covering the tip end portion of a coil end protruding from the core of the stator; and a second resin layer laminated on the core side of the first resin layer so as to cover the surface of the first resin layer on the core side.

The inside edge of the first resin layer in the diameter direction of the stator and the outside edge of the first resin may both extend toward the second resin layer to thereby form banks.

The first resin layer and the second resin layer may wholly cover the tip end side of the coil end including a plurality of coil conducting wires protruding from the core.

According to this disclosure, two kinds of resins are supplied from respectively different directions, so that the resin can permeate well.

BRIEF DESCRIPTION OF DRAWINGS

Embodiment(s) of this disclosure will be described by reference to the following figures, wherein.

DESCRIPTION OF EMBODIMENTS

Embodiments of this disclosure will now be described with reference to the drawings. This disclosure is not limited to the embodiments below.

<Stator Structure>

Figure 1:
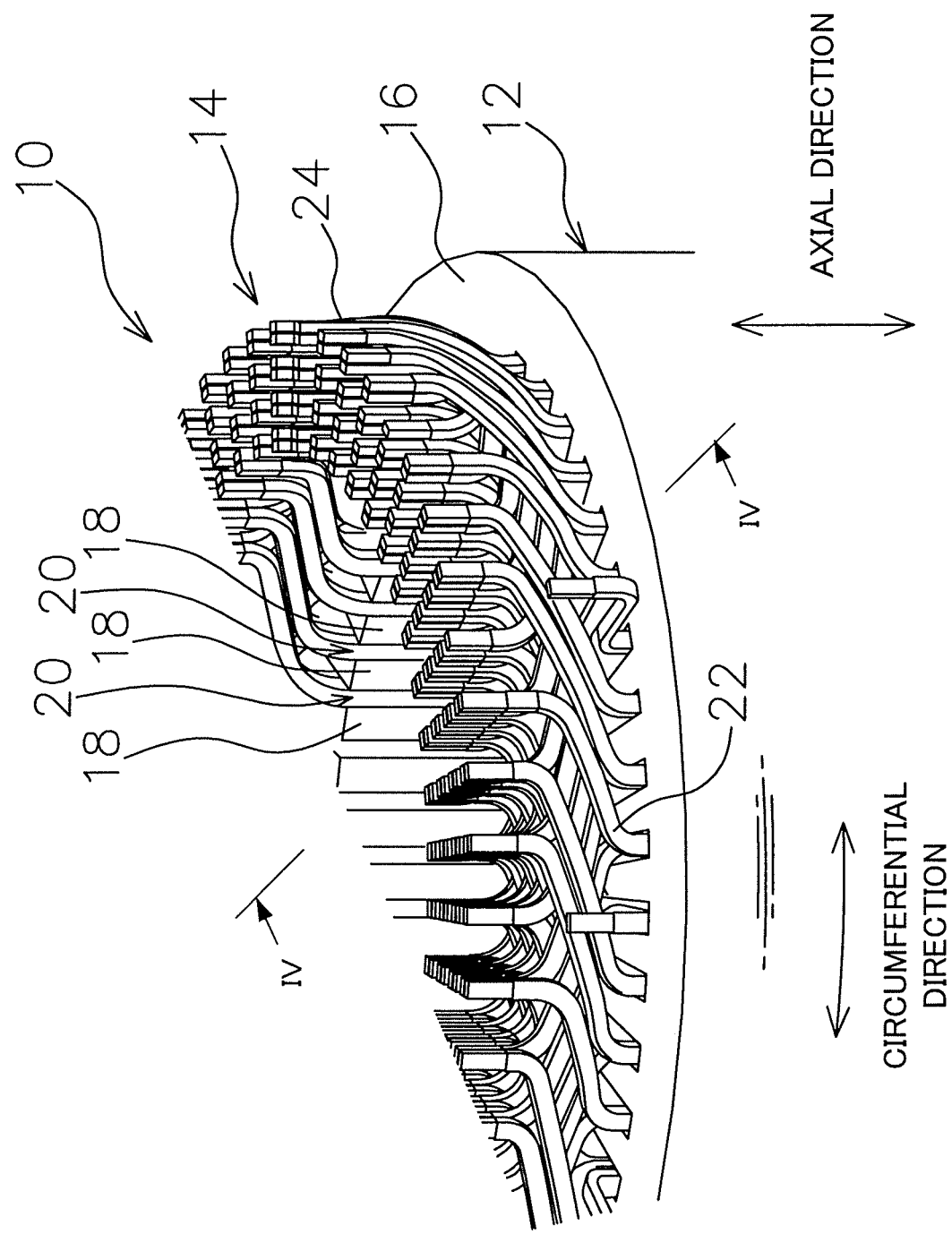
FIG. 1 is a perspective view of a structure of the coil end of a stator.

FIG. 1 illustrates a schematic structure of a stator 10. The stator 10 includes a substantially cylindrical or annular stator core 12 and coils 14 wound on the inner circumferential side of the stator core 12. The stator core 12 has a cylindrical or annular yoke 16 and a plurality of teeth 18 extending inward from the yoke 16 in the diameter direction of the stator 10. The teeth 18 are aligned at intervals along the circumferential direction of the stator 10. The space between the adjacent teeth 18 is referred to as a slot 20. The coil 14 is disposed in the slot 20, whereby the coil 14 is wound around the teeth 18. The coil 14 includes a coil conducting wire 22, for example, having a rectangular cross section. The coil conducting wire 22 includes a portion remaining in the slot 20 and a portion extending from that portion in the axial direction of the stator 10 to protrude from the end surface of the stator core 12 to thereby form a coil end 24. The coil conducting wire 22 protruding from a slot 20 is connected to a coil conducting wire 22 protruding from another slot 20 in the coil end 24 whereby the coil 14 is formed.

Figure 2:
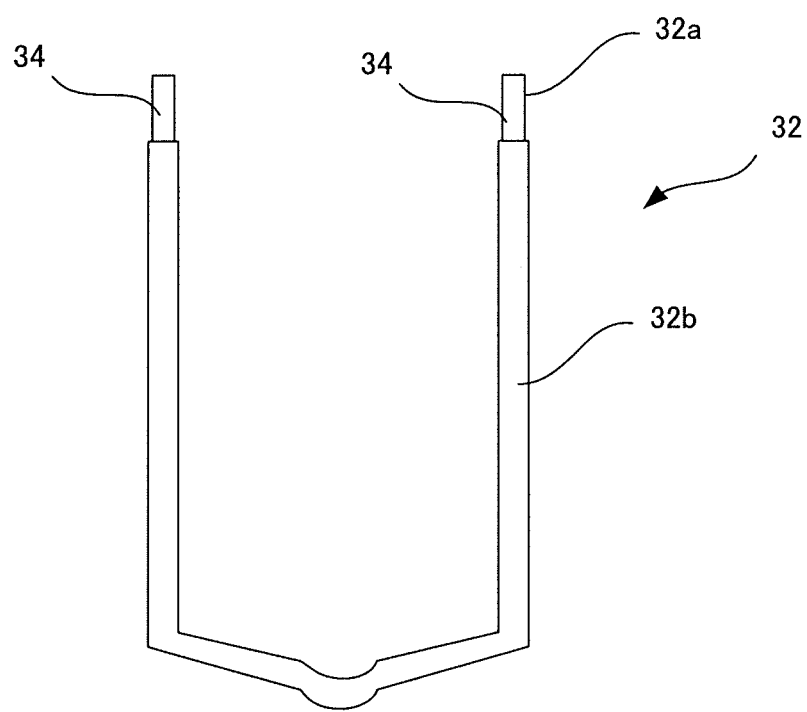
FIG. 2 illustrates the structure of a segment coil.

The coil conducting wire 22 is made from a U-shaped segment coil 32, such as is illustrated in FIG. 2. That is, the two legs of the segment coil 32 are inserted into respective different slots 20 such that the lead portions 34 on the respective tip end sides of the two legs project from the stator core 12. The lead portion 34 is bent in the circumferential direction and connected to the lead portion 34 of another segment coil 32, whereby the coil 14 is formed. The segment coils 32 are normally welded for connection. The segment coil 32 is wholly covered by an insulating film 32b except the tip end portion 32a of the lead portion 34 thereof for connection of the segment coils 32. That is, the tip end portion 32a of the lead portion 34 is not covered by the insulating film 32b so that the tip end portion 32a can be connected to the tip end portion 32a of another segment coil 32.

Figure 3B:
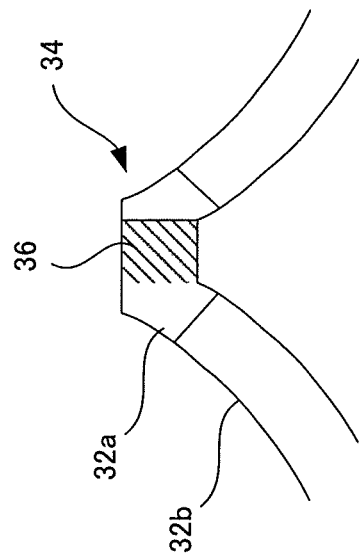
FIG. 3B illustrates another structure of a connection portion of segment coils.
Figure 3A:
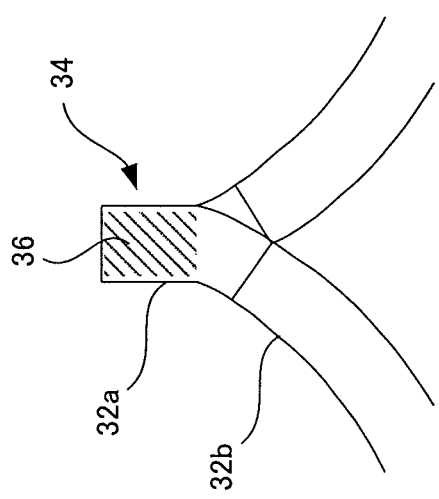
FIG. 3A illustrates the structure of a connection portion of segment coils.

In FIG. 1, the tip end portion 32a is directed upward, as illustrated in FIG. 3A. The tip end portion 32a makes a connection portion. This structure, however, is not mandatory. Alternatively, as illustrated in FIG. 3B, it is also preferable that the tip end portion 32a extends laterally. A connection portion 36, illustrated with diagonal lines in FIGS. 3A and 3B, corresponds to a connection portion where two tip end portions 32a are welded to each other.
<Structure of Resin Layer>

Figure 4:
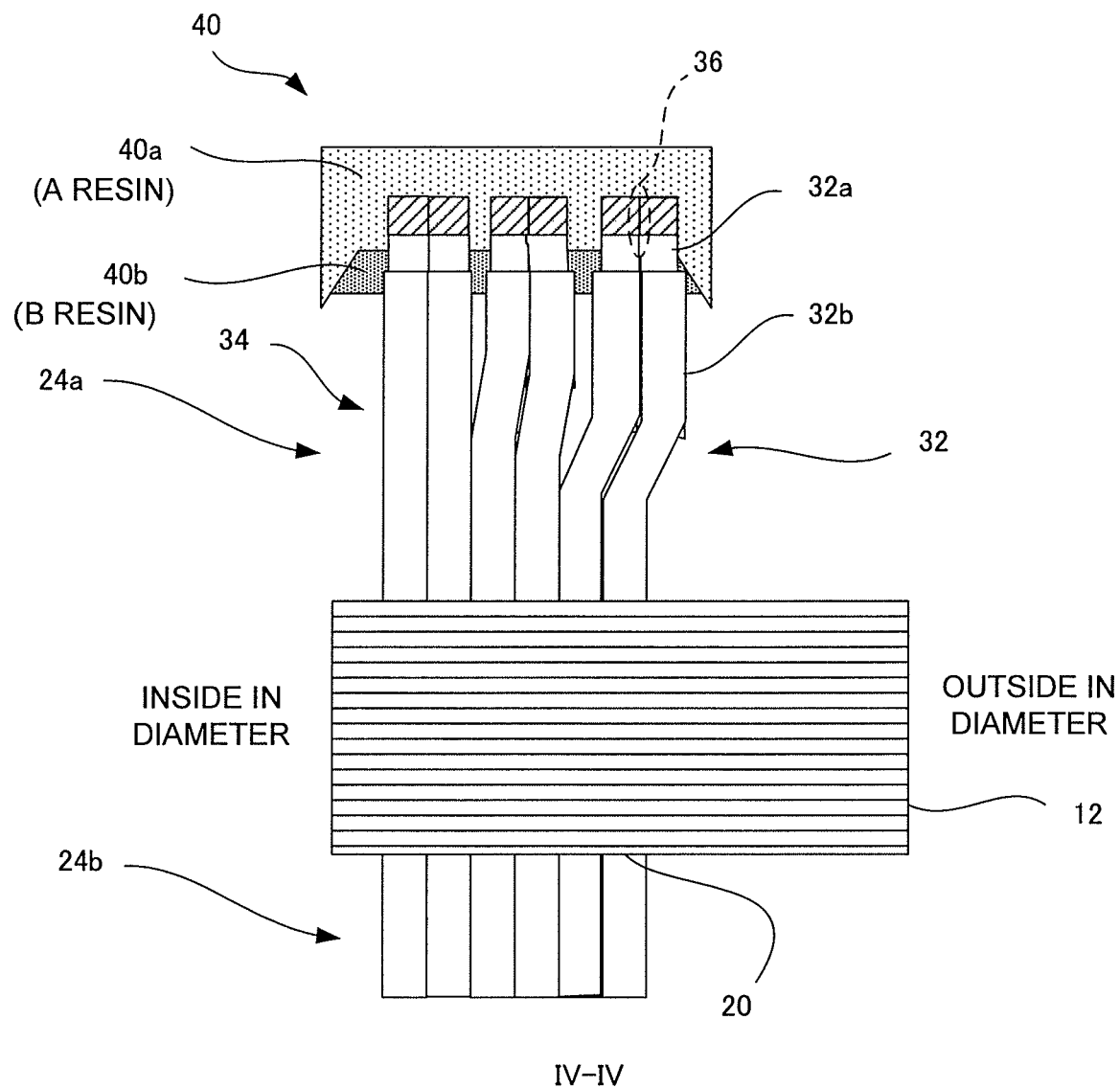
FIG. 4 illustrates a coil end covered with a resin layer (the cross section along IV-IV in FIG. 1)

FIG. 4 is a schematic cross sectional view of the stator core 12 along the axial direction (a cross section along the line IV-IV in FIG. 1). As described above, the segment coil 32 extends upward from the stator core 12, and two adjacent tip end portions 32a are welded to each other. In the above, every two leading portions 34 of the segment coils 32 projecting from the stator core 12 and welded to each other make a pair. The pairs are formed such that each pair is separated from its adjacent pairs. For example, a wedge jig is inserted into the space between a pair of lead portions 34, whereby the lead portion 34 is made to bend to thereby create a space between the pairs.

In this embodiment, a resin layer 40 is formed covering the connection portion of two tip end portions 32a. In other words, a portion of the lead portion 34 on the tip end side of the lead portion 34 (the tip end side of the lead portion 34) is buried in the resin layer 40. The resin layer 40 has a laminated structure including a layer of A resin 40a and a layer of B resin 40b, the layer of A resin 40a being positioned farther from the stator core 12, the layer of B resin 40b being positioned closer to the stator core 12. As illustrated, it is preferable that the layer of A resin 40a covers the connection portion of the tip end portions 32a, and that the layer of B resin 40b covers both the tip end portions 32a and portions of the insulating films 32b closer to the tip end portions 32a.

Intervention of the resin between adjacent pairs of the tip end portions 32a enables reliable insulation between the pairs. Moreover, the resin filled in the space can prevent short-circuit between the tip end portions 32a when using the stator 10, the short-circuit attributed to a foreign body filled in the space.
<Formation of Resin Layer>
(Device Structure)

Figure 5:
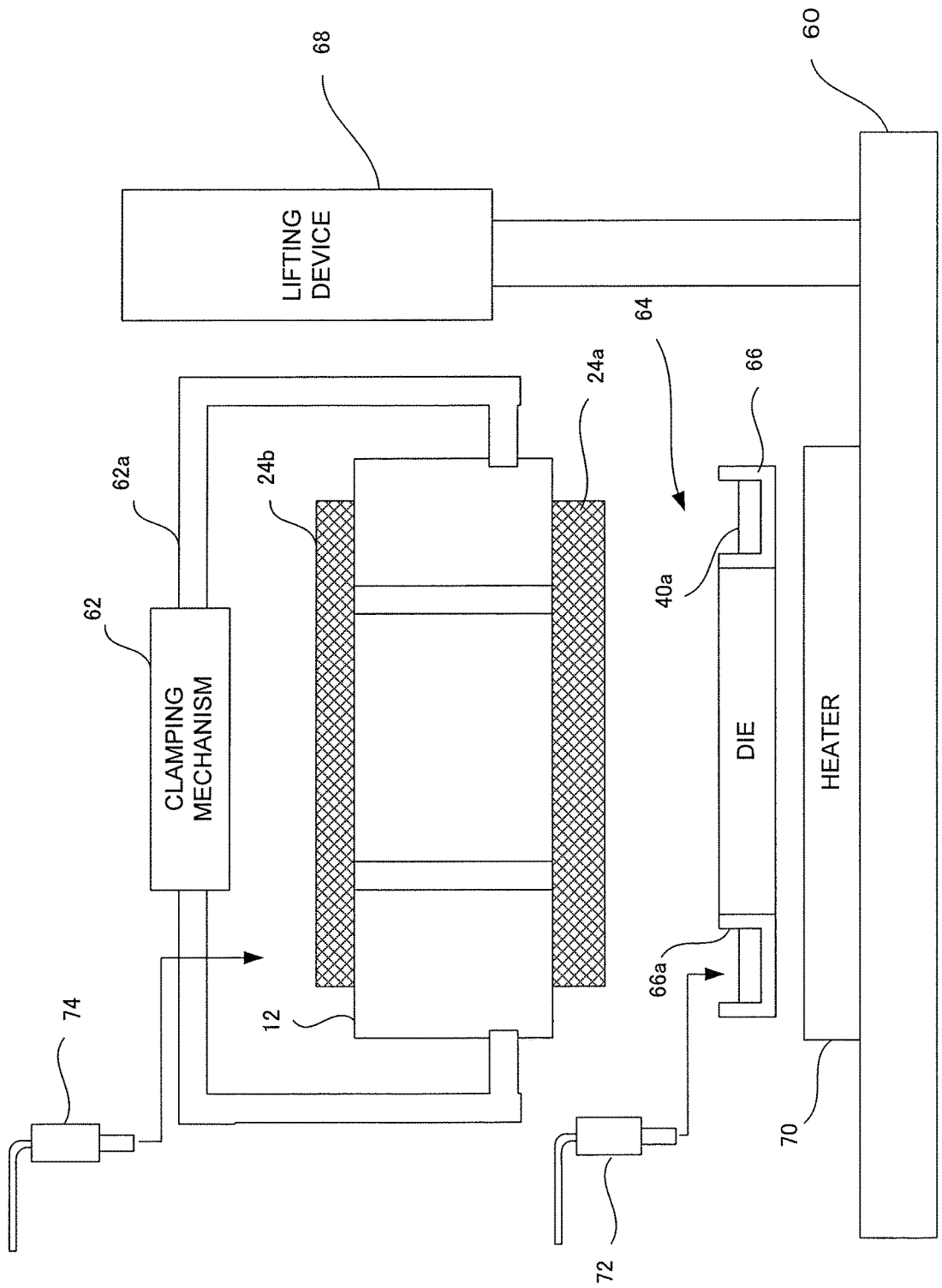
FIG. 5 illustrates a structure of a device for forming a resin layer.

FIG. 5 illustrates a device for forming the resin layer 40. In FIGS. 1 to 4, the coil end 24 (24a) with the lead portion 34 is illustrated on the upper side of the drawings. Meanwhile, in FIG. 5, the stator is held such that the coil end 24 (24a) with the lead portion 34 is positioned on the lower side. Accordingly, in FIG. 5, the horizontal bar portion of the U-shape of the segment coil 32 is positioned above the stator core 12, and the connection portion of the tip end portions 32a is positioned below the stator core 12.

The device has a base 60, on which various devices are mounted. The device has a clamping mechanism 62 for clamping the stator core 12. The clamping mechanism 62, while clamping the stator 10, moves the stator core 12 or keeps the stator core 12 at a halt in a predetermined position. The clamping mechanism 62 has, for example, a plurality of arms 62a to therewith clamp the stator core 12.

The base 60 has a die 64. The die 64 has an annular gutter 66, where the liquid A resin 40a, or first resin, is to be pooled. The gutter 66 has a shape corresponding to the shape of a portion of the coil end 24a on the lead portion 34 side and is sized slightly larger than the portion of the coil end 24 (a wider diameter).

A lifting device 68 raises and lowers the clamping mechanism 62 to thereby raise and lower the clamped stator core 12. A heater 70 is installed below the die 64 to heat the A resin 40a in the gutter 66.

A dispenser 72 dispenses the A resin 40a to the gutter 66. Another dispenser 74 dispenses the B resin 40b, or second resin, via a space above the coil end 24b to the coil end 24a and the gutter 66. The dispensers 72, 74 can move along a predetermined route.
(Operation)

An operation of forming the resin layer 40 will now be described with reference to FIG. 6. Initially, the stator 10 is clamped with the clamping mechanism 62. In the above, the clamping mechanism 62 may move to the position where the stator 10 is mounted to clamp the stator 10, or another moving mechanism may move the stator 10 to a place where the clamping mechanism 62 can clamp the stator 10 before the clamping mechanism 62 clamps the stator 10. The A resin 40a is fed into the gutter 66 of the die 64 from the dispenser 72. The A resin 40a may be fed into the gutter 66 before or while the clamping mechanism 62 clamps the stator 10.

After completion of the above described preparation, the lifting device 68 lowers the clamping mechanism 62 to thereby lower the clamped stator 10. That is, the stator 10 is held above the gutter 66 (the state (i)), and then lowered until the tip end side of the coil end 24a is plunged into the A resin 40a in the gutter 66 (the state (ii)).

With the coil end 24a plunged into the A resin 40a, the liquid level of the A resin 40a rises. Specifically, the liquid surface of the A resin 40a rises along the annular inner wall 66a (the inside and outside circumferential walls) of the gutter 66 due to the meniscus effect. Consequently, the liquid surface is positioned higher along the circumference and lower in the middle portion. As the A resin 40a is permeating into a space in the coil end 24a, the liquid level (the liquid surface) lowers. Consequently, as in the state (ii), the A resin 40a forms a bank 42 having a wedge cross-section along the inside and outside inner walls 66a of the gutter 66, or the die.

The A resin 40a is then heated by the heater 70 to be cured. Consequently, the A resin 40a is cured into an annular shape covering the coil end 24a and having the bank 42 along its inside and outside circumferences.

Figures 7A, 7B:
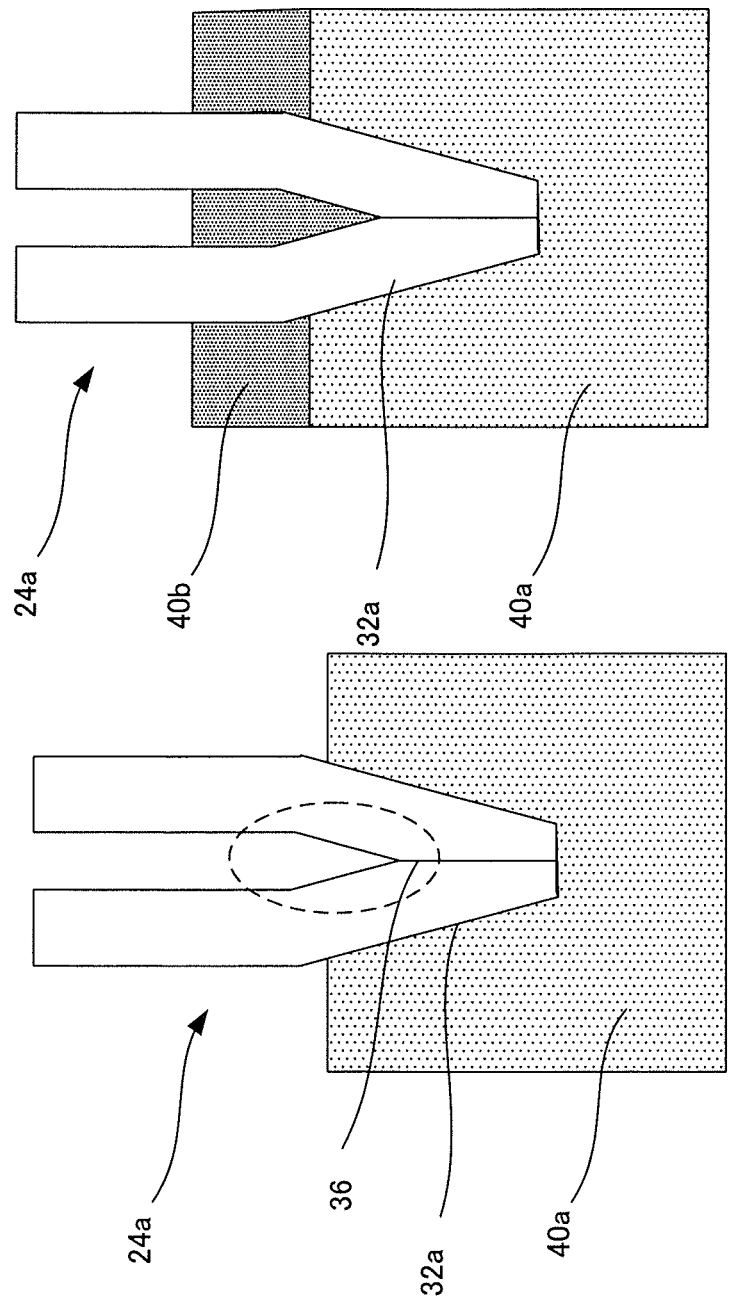
FIG. 7A illustrates a state with A resin filled.
FIG. 7B illustrates a state with A and B resins filled.

Thereafter, the B resin 40b is dropped. Specifically, the B resin 40b is supplied from a side opposite from the A resin 40a relative to the coil end 24a. The B resin 40b, having viscosity lower than that of the A resin 40a, remains on the cured A resin 40a after having been dropped (the state (iii)). In particular, the B resin 40b permeates into the upper surface side of the connection portion of the two tip end portions 32a in the coil end 24a. That is, as illustrated in FIG. 7A, the A resin 40a reaches positions under and on the side of the connection portion of two tip end portions 32a, but may not be able to permeate into the upper surface side (the portion indicated by the broken oval line) of the coils on the upper side of the connection portion 36 of the tip end portions 32a. Meanwhile, dropping the B resin 40b can cause the B resin 40b to permeate into the upper surface side of the coils on the upper side of the connection portion 36.

The B resin 40b is then heated by the heater 70 to be cured.

In this embodiment, resin whose viscosity is lower than that of the A resin 40a is used as the B resin 40b, and the B resin 40b is dropped from above the A resin 40a. Alternatively, even in the case where resin whose viscosity is equivalent to or higher than that of the A resin 40a is used, the B resin may be able to be supplied into a space above the connection portion. This is because dropping the B resin 40b from above can cause the B resin 40b to descend along the surface of a coil wire. In this view, lower viscosity of the B resin 40b than that of the A resin 40a is not mandatory.

Preferably, epoxy resin, which is thermoset resin, is used as the A resin 40a. The viscosity of the A resin 40a is desirably adjustable. Alternatively, silicone resin, for example, is usable as the A resin 40a. As the B resin 40b, polish, such as epoxy resin-based polish, is preferably used. It is preferably that the A resin 40a is liquid before being cured, although powdery A resin 40a having sufficient liquidity can be used as well. It is preferably that the B resin 40b is liquid.

Figure 6:
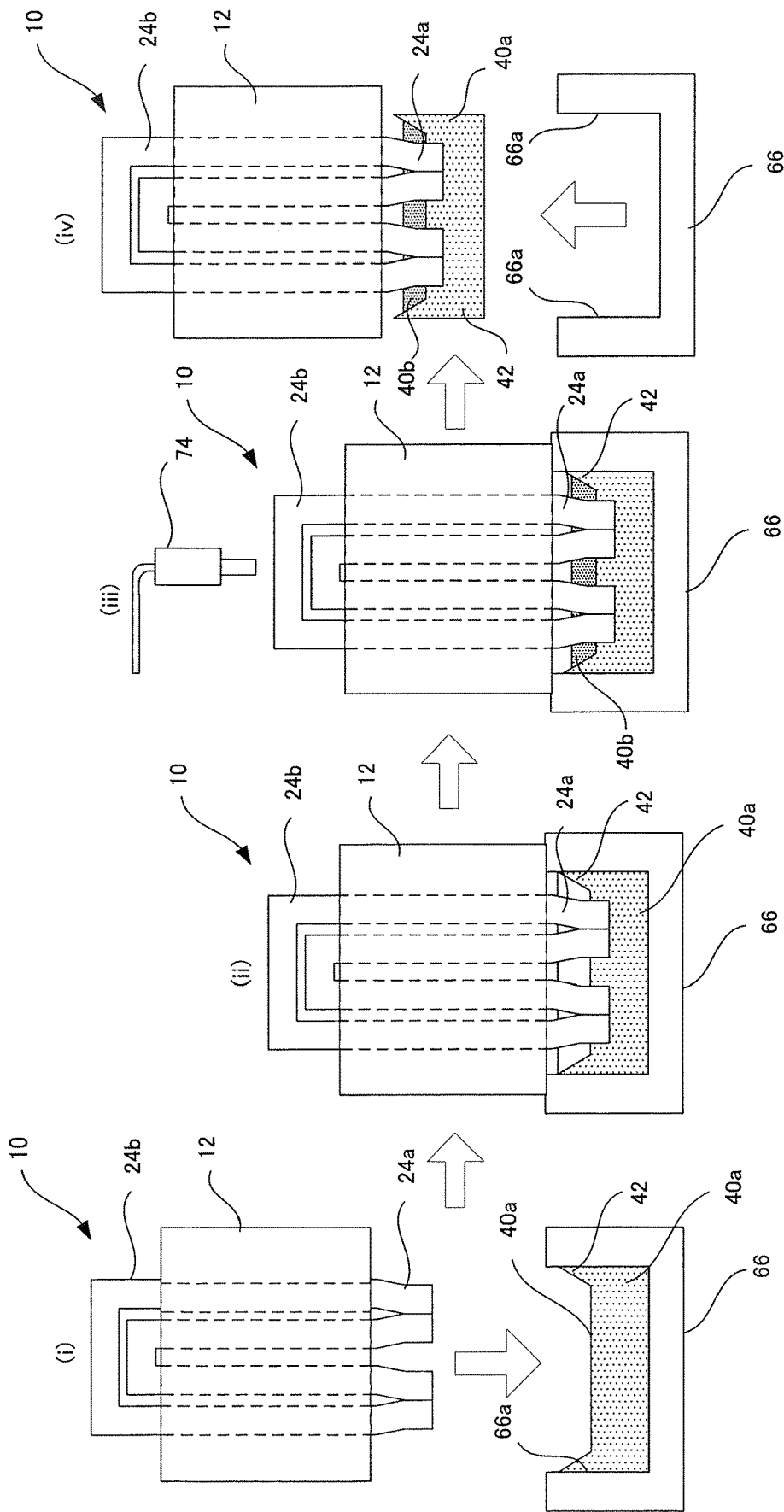
FIG. 6 is a diagram to explain an operation of forming a resin layer.

After the A resin 40a and B resin 40b are cured as described above, the stator 10 is lifted up, as in the state (iv) in FIG. 6. With the above, the stator 10 having the coil end 24a covered on its tip end side with the resin layer 40 including the A resin 40a and the B resin 40b is formed.

Figure 8B:
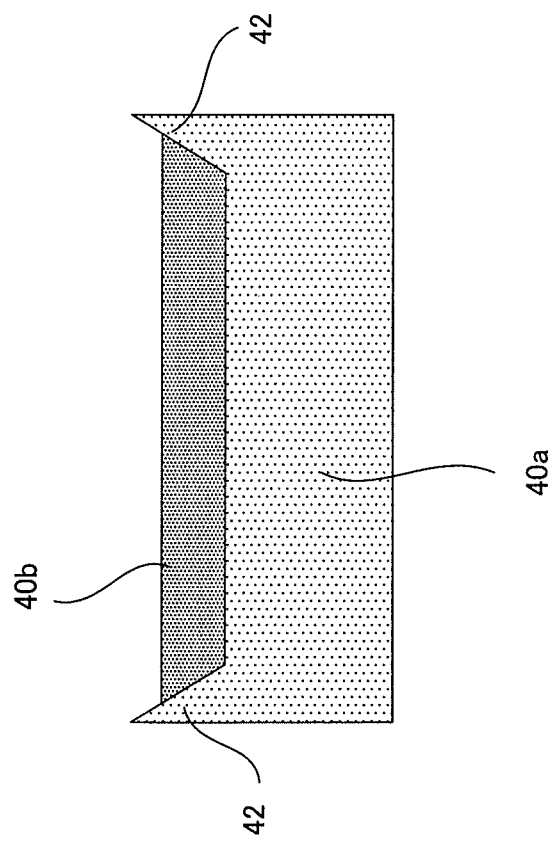
FIG. 8B illustrates a state with B resin kept not flowing out.
Figure 8A:
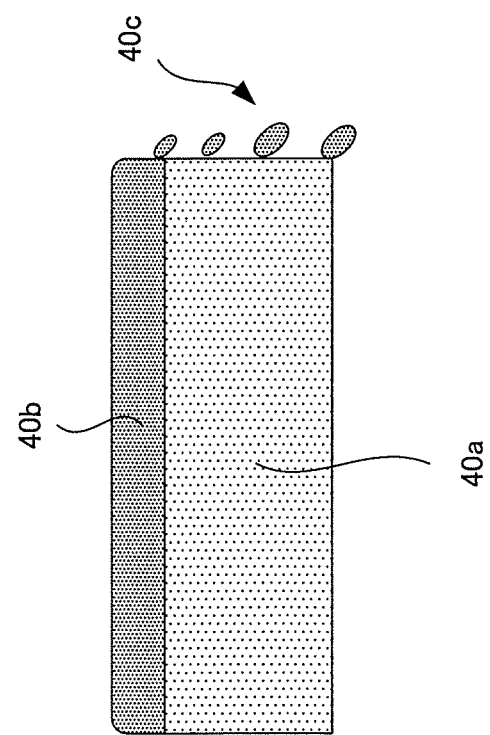
FIG. 8A illustrates a state with B resin flowing out.

In this embodiment, the B resin 40b is dropped while the coil end 24a is held in the gutter 66, or a die. As a result, the B resin 40b is held on the circumferential wall of the gutter 66 and does not flow to the outside. In contrast, if the B resin 40b is dropped onto a flat surface of A resin 40a, the B resin 40b will possibly flow around and is formed into an icicled shape on the outside wall of the A resin 40a (40c), as illustrated in FIG. 8A. This embodiment can avoid this phenomenon (FIG. 8B), and thus enables formation of the resin layer 40 as designed.

Figure 9A:
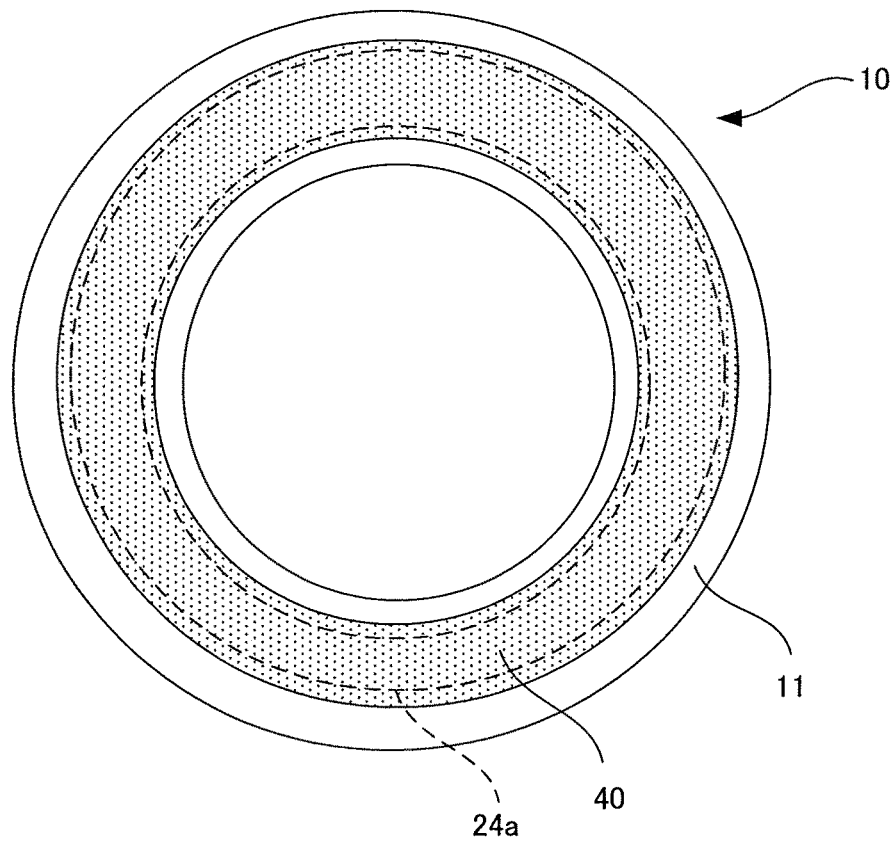
FIG. 9A illustrates a stator with a resin layer thereon as viewed from the axial direction.
Figure 9B:
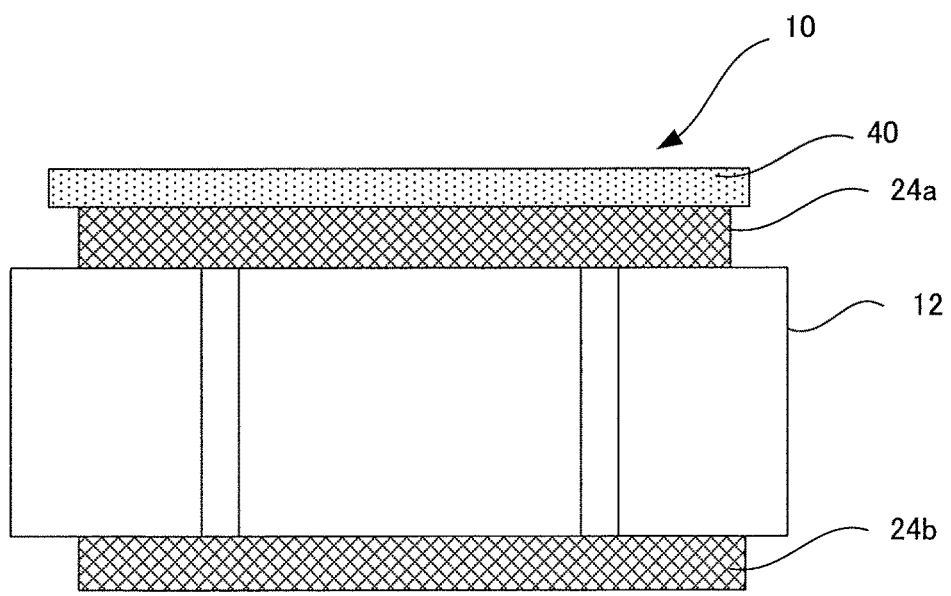
FIG. 9B is a side view of a stator with a resin layer thereon as viewed from the diameter direction.

FIGS. 9A and 9B schematically illustrate a stator with the resin layer 40 thereon. FIG. 9A illustrates the stator as viewed from below in the axial direction. FIG. 9B illustrates the stator as viewed from the outside in the diameter direction (with the coil end 24a positioned above). In FIG. 9A, circles that define the inner edges are illustrated with the teeth not illustrated.

As described above, the resin layer 40 is annular, and wholly covers the tip end side (a portion with the connection portion) of the coil end 24a. This structure requires less precise positioning, as compared with a structure in which each connection portion of the coil conducting wires 22 is individually covered, and thus can improve productivity.

Figure 10:
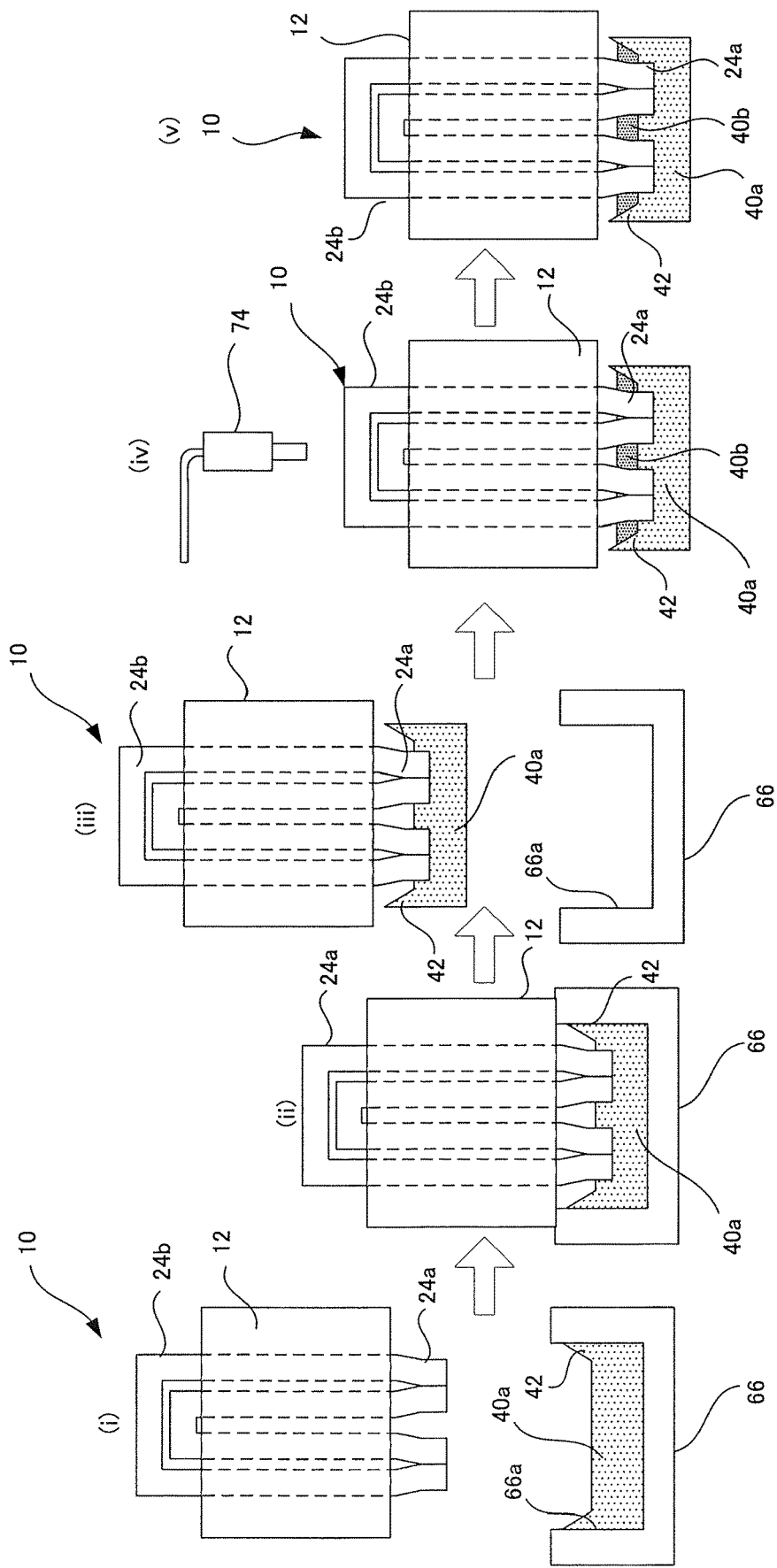
FIG. 10 is a diagram to explain another example operation of forming a resin layer.

FIG. 10 illustrates a manufacturing method according to another embodiment. In this example, the steps until curing the A resin 40a in the states (i) and (ii) are the same as those according to the method illustrated in FIG. 6. In a following step, the stator 10 is lifted up, as in the state (iii), to thereby separate the stator core 12 with the A resin layer 40 thereon from the gutter 66. Then, the B resin 40b is dropped from the above (the state (iv)) to form a layer of the B resin 40b. The layer of the B resin 40b is then heated to be cured. With the above, a stator 10 in the state (v), similar to the stator 10 in the state (iv) illustrated in FIG. 6, is formed.

In this embodiment as well, the bank 42 made of the A resin 40a is formed along the circumferential wall of the gutter 66. This can prevent the B resin 40b being dropped, as in the state (iv) in FIG. 10, from flowing around and forming an icicled shape. In the state (iv), an adequate amount of B resin 40b that does not cause overflow of the B resin 40b is dropped.

"Others"

Although the A resin 40a is first cured and the B resin 40b is then dropped and cured in the above description, the B resin 40b may be dropped without curing the A resin 40a. As the A resin has some viscosity, it is often the case that the A resin is not mixed instantly with the B resin 40b being dropped. In this case, both the A resin 40a and the B resin 40b can be cured in a single heating step. Note that even if the A resin 40a and the B resin 40b should be slightly mixed, the mixture does not constitute a damage to the resin layer 40. Good permeation of resin to the tip end side of the coil end 24a is essential.

The invention claimed is:

1. A method for manufacturing a stator, comprising:
a first resin layer forming step of forming a first thermoset resin layer by impregnating a tip end side of a coil end with first thermoset resin, the coil end protruding from a core of the stator, the first thermoset resin having liquidity; and
a second resin layer forming step of forming a second thermoset resin layer on the first thermoset resin layer by dropping second thermoset resin from a core side of the coil end toward the tip end side; and
a curing step of curing the first thermoset resin and the second thermoset resin, wherein
in the first resin layer forming step, the first thermoset resin is liquid and pooled inside a die, and
the tip end side of the coil end is plunged into the first thermoset resin, which is liquid, and kept plunged until a level of a liquid surface of the first thermoset resin inside the die rises along a circumferential wall of the die and lowers in a middle portion of the first thermoset resin.

2. The method for manufacturing a stator according to claim 1, wherein the second thermoset resin has viscosity lower than that of the first thermoset resin.

3. The method for manufacturing a stator according to claim 2, wherein
the curing step includes a first curing step and a second curing step,
the first curing step is executed after the first resin layer forming step to cure the first thermoset resin, and
the second curing step is executed after the second resin layer forming step to cure the second thermoset resin.

4. The method for manufacturing a stator according to claim 1, wherein
the curing step includes a first curing step and a second curing step,
the first curing step is executed after the first resin layer forming step to cure the first thermoset resin, and
the second curing step is executed after the second resin layer forming step to cure the second thermoset resin.

5. The method for manufacturing a stator according to claim 1, wherein the coil end including a plurality of coil conducting wires aligned in a circumferential direction of the stator protrudes from the core of the stator.

* * * * *